United States Patent
Zhu et al.

(10) Patent No.: US 10,691,705 B2
(45) Date of Patent: Jun. 23, 2020

(54) DATA PROCESSING METHOD, DATA PROCESSING DEVICE, AND RECORDING MEDIUM

(71) Applicant: HITACHI, LTD., Tokyo (JP)

(72) Inventors: Yuncheng Zhu, Tokyo (JP); Hideki Okita, Tokyo (JP)

(73) Assignee: HITACHI LTD., Tokyo (JP)

(*) Notice: Subject to any disclaimer, the term of this patent is extended or adjusted under 35 U.S.C. 154(b) by 230 days.

(21) Appl. No.: 15/922,456

(22) Filed: Mar. 15, 2018

(65) Prior Publication Data

US 2019/0012319 A1 Jan. 10, 2019

(30) Foreign Application Priority Data

Jul. 7, 2017 (JP) .................. 2017-133182

(51) Int. Cl.

| G06F 16/24 | (2019.01) |
|---|---|
| G06F 16/2457 | (2019.01) |
| G06F 17/30 | (2006.01) |
| G06F 17/14 | (2006.01) |
| G06F 17/18 | (2006.01) |
| G06F 16/9038 | (2019.01) |
| G06F 16/903 | (2019.01) |
| G06F 16/248 | (2019.01) |
| G06F 16/2458 | (2019.01) |

(52) U.S. Cl.
CPC ...... *G06F 16/24578* (2019.01); *G06F 16/248* (2019.01); *G06F 16/2477* (2019.01); *G06F 16/9038* (2019.01); *G06F 16/90335* (2019.01); *G06F 17/141* (2013.01); *G06F 17/18* (2013.01); *G06F 17/3053* (2013.01); *G06F 17/30979* (2013.01); *G06F 17/30991* (2013.01)

(58) Field of Classification Search
USPC ....................................................... 707/725
See application file for complete search history.

(56) References Cited

U.S. PATENT DOCUMENTS

2009/0282299 A1* 11/2009 Kuroda et al.
2012/0140069 A1* 6/2012 Ding et al.

FOREIGN PATENT DOCUMENTS

JP 2002-230036 A 8/2002

* cited by examiner

*Primary Examiner* — Muluemebet Gurmu
(74) *Attorney, Agent, or Firm* — Volpe and Koenig, P.C.

(57) ABSTRACT

The method includes: identifying a type of a data item in which the data is stored, using an overlap pattern indicating the type of the data item and a method for identifying the type; processing the data stored in the data item, using calculation designated for each type of the data item, and adding at least one or more new data items to the type of the data item storing the processed data; and calculating scores obtained by quantifying an amount of information displayed on a display screen for the data items including the added data items and arranging the data items on the basis of the scores.

14 Claims, 13 Drawing Sheets

EXAMPLE OF CONFIGURATION OF SYSTEM ACCORDING TO EMBODIMENT 1

EXAMPLE OF CONFIGURATION OF SYSTEM ACCORDING TO EMBODIMENT 1

EXAMPLE OF CONFIGURATION OF PROCESSING DEVICE ON COMPUTER

FIG. 3

TYPE IDENTIFICATION INFORMATION TABLE

| 301 | 302 | 303 |
|---|---|---|
| TYPE ID | TYPE NAME | IDENTIFICATION METHOD |
| 1 | MEASURED VALUE | REGEXP{¥d+¥.?¥d*} |
| 2 | TIME | REGEXP{¥d{4}-¥d{2}-¥d{2} ¥d{2}:¥d{2}:¥d{2}} |
| 3 | GROUP ID (CONTINUOUS) | {...} |
| 4 | GROUP ID (VARIANCE) | {...} |
| ... | ... | ... |

FIG. 4

ARITHMETIC PROCESSING INFORMATION TABLE

| 401 | 402 | 403 |
|---|---|---|
| PROCESSING ID | TYPE | ARITHMETIC PROCESSING CONTENT |
| A | MEASURED VALUE | function proc_a(x) {...} |
| B | MEASURED VALUE | function proc_b(x) {...} |
| C | GROUP ID (CONTINUOUS) | function proc_c(x, y) {...} |
| D | GROUP ID (VARIANCE) | function proc_d(x) {...} |
| ... | ... | ... |

FIG.5
INPUT DATA INFORMATION TABLE

| DATA ID (501) | GENERATION TIME (502) | DATA SOURCE (503) | ITEM 1 (504) | ITEM 2 (504) | ITEM 3 (504) | ... |
|---|---|---|---|---|---|---|
| 1 | 2017-02-22 00:00:00 | GW1 | 26.5 | G77 | BS001 | ... |
| 2 | 2017-02-22 00:00:05 | GW2 | S12345 | 12.5 | 2017-02-22 00:00:01 | ... |
| 3 | 2017-02-22 00:00:35 | GW2 | S12346 | 12.5 | 2017-02-22 00:00:27 | ... |
| 4 | 2017-02-22 00:01:00 | GW1 | 25.6 | G77 | BS002 | ... |
| ... | ... | ... | ... | ... | ... | ... |

FIG.6
DATA PROCESSING INFORMATION TABLE

| ITEM ID (601) | TYPE (602) | ARITHMETIC RESULT (603) | SCORE (604) | COEFFICIENT (605) | ORDER (606) | |
|---|---|---|---|---|---|---|
| GW1-1 | MEASURED VALUE | ARITHMETIC PROCESSING A: GW1-1-1, ARITHMETIC PROCESSING B: GW1-1-2 | 76 | 1.0 | 2 | ⎫ |
| GW1-2 | GROUP ID (CONTINUOUS) | ARITHMETIC PROCESSING C: GW1-2-1 | 34 | 1.0 | 13 | ⎪ |
| GW1-3 | GROUP ID (VARIANCE) | ARITHMETIC PROCESSING D: GW1-3-1 | 86 | 0.5 | 8 | ⎪ |
| ... | ... | ... | ... | ... | ... | ⎬ 607 |
| GW2-1 | UNIQUE ID | [null] | 68 | 1.0 | 7 | ⎪ |
| GW2-2 | MEASURED VALUE | ARITHMETIC PROCESSING A: GW2-2-1, ARITHMETIC PROCESSING B: GW2-2-2 | 42 | 1.0 | 11 | ⎪ |
| GW2-3 | TIME | ARITHMETIC PROCESSING E: GW2-3-1, ARITHMETIC PROCESSING F: GW2-3-2 | 46 | 2.25 | 4 | ⎪ |
| ... | ... | ... | ... | ... | ... | ⎭ |
| GW1-1-1 | MEASURED VALUE (CALCULATION) | [null] | 75 | 1.5 | 1 | ⎫ |
| GW1-1-2 | MEASURED VALUE (CALCULATION) | [null] | 56 | 1.0 | 3 | ⎬ 608 |
| ... | ... | ... | ... | ... | ... | ⎭ |

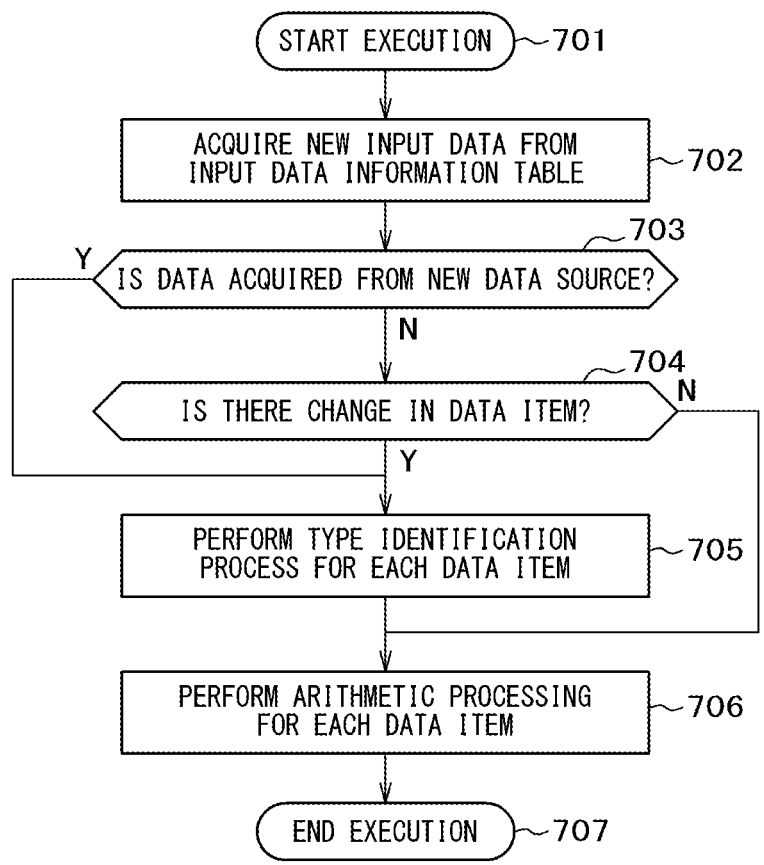

SCORE CALCULATION PROGRAM

EXAMPLE OF CONFIGURATION OF PROCESSING DEVICE ON COMPUTER

FIG.12

DATA ITEM INFORMATION TABLE

| DATA SOURCE | ITEM ID | TYPE | ARITHMETIC RESULT |
|---|---|---|---|
| WORK LOG | A001 | UNIQUE ID | ARITHMETIC PROCESSING A: A001-1, ARITHMETIC PROCESSING B: A001-2 |
| WORK LOG | A002 | GROUP ID (CONTINUOUS) | ARITHMETIC PROCESSING C: A002-1 |
| WORK LOG | A003 | GROUP ID (VARIANCE) | [null] |
| ... | ... | ... | ... |
| FACILITY LOG | D01-A | MEASURED VALUE | ARITHMETIC PROCESSING D: D01-A-1 |
| FACILITY LOG | D01-B | MEASURED VALUE | ARITHMETIC PROCESSING A: D01-B-1, ARITHMETIC PROCESSING B: D01-B-2 |
| ... | ... | ... | ... |

Columns: 1201, 1202, 1203, 1204

FIG.13

DATA PROCESSING INFORMATION TABLE

| ITEM ID | SCORE FOR TIME PERIOD 1 | SCORE FOR TIME PERIOD 2 | SCORE FOR TIME PERIOD 3 | ... |
|---|---|---|---|---|
| A001 | 86 | 46 | 30 | ... |
| A001-1 | 67 | 34 | 25 | ... |
| ... | ... | ... | ... | ... |
| D01-A | 75 | 53 | 28 | ... |
| ... | ... | ... | ... | ... |
| D01-B | 23 | 23 | 22 | ... |
| ... | ... | ... | ... | ... |

Columns: 1301, 1302, 1302, 1302

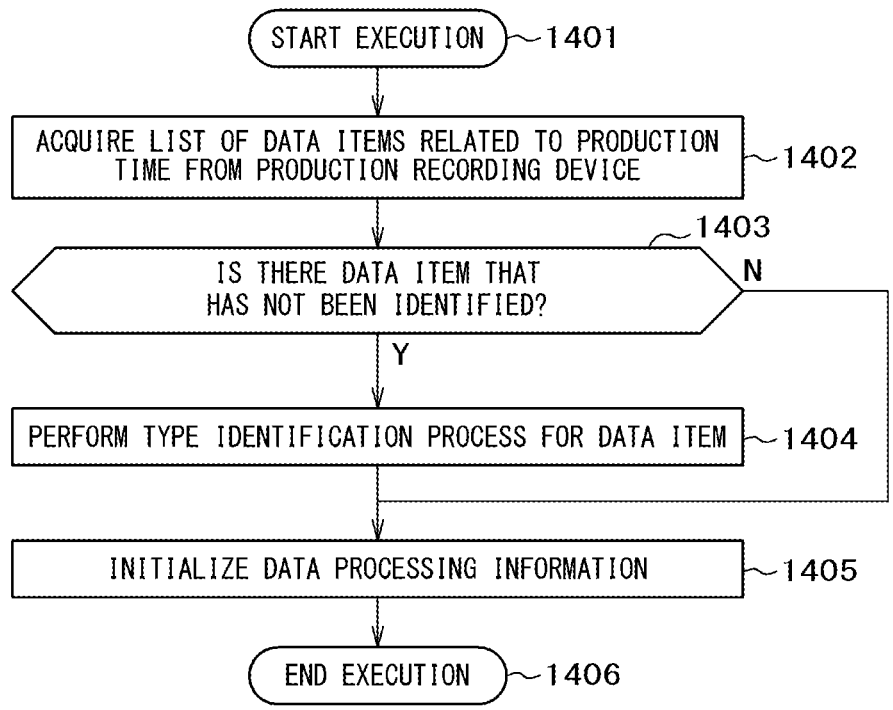

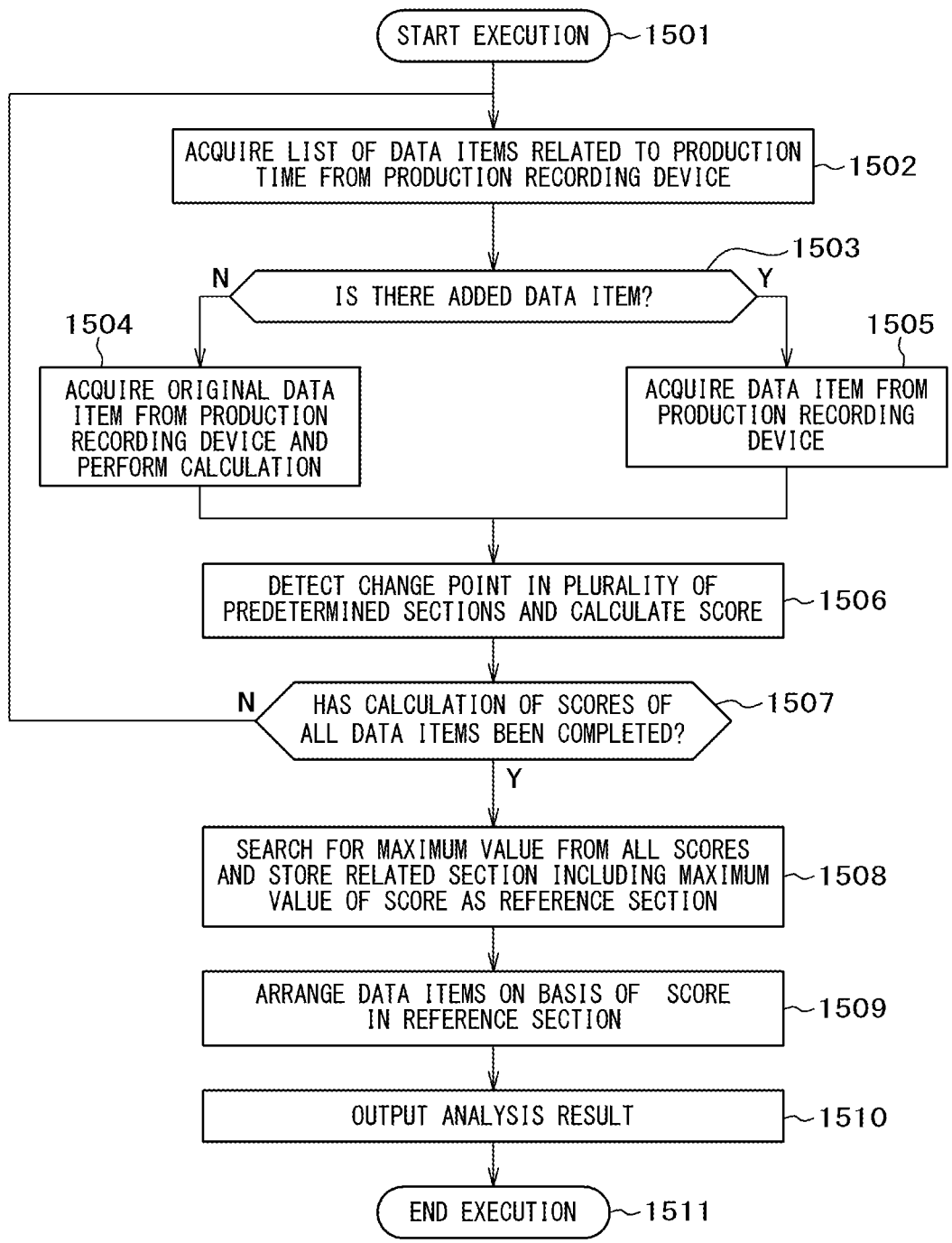

DATA PROCESSING METHOD, DATA PROCESSING DEVICE, AND RECORDING MEDIUM

CLAIM OF PRIORITY

The present application claims priority from Japanese application serial no. JP2017-133182, filed on Jul. 7, 2017, the content of which is hereby incorporated by reference into this application.

TECHNICAL FIELD

The present invention relates to the recording, analysis, and display of time-series data.

BACKGROUND ART

In a case in which, for example, monitoring or analysis is performed in a data visualization system according to the related art, a data processing and display system selects a data item from a plurality of data items and designates the display order of the data items on the basis of a request from a user and the knowledge and know-how of a data analyzer. However, with the spreading of an Internet-of-Things (IoT) technique that provides information communication between all things through the Internet, various things are connected to the network and various and many data candidates are to be monitored or analyzed. In this case, an operation of selecting a data item and an operation of designating the display order are very complicated and it is preferable to automate the operation to some extent.

As a technique that supports the selection of a data item and the designation of the display order, there is a data list display device which displays data requested by the user at a position that is easy to find. Japanese Unexamined Patent Application Publication No. JP 2002-230036 (Patent Document 1) discloses a data list display device including a data storage unit that stores a plurality of data items, a list display unit that displays a list of the data stored in the data storage unit, a display attribute setting unit that sets a data item for designating a position where the list is displayed by the list display unit to each data item in the data storage unit, and a display order setting unit that sets a position where a list of data designated by the user in the data storage unit is displayed to the data item set by the display attribute setting unit. Patent Document 1 also discloses a method in which the list display unit displays a list of the data in the data storage unit in a display order that is desired by the user and is set by the display order setting unit.

SUMMARY OF THE INVENTION

However, in the data monitoring analysis support technique according to the related art disclosed in Patent Document 1, the user needs to designate a desired display order and a data item for designating the display order in advance. Therefore, in the technique according to the related art, it is difficult to automate the selection of a data item and the designation of a display order.

An object of the invention is to automate the selection of a data item and the designation of a display order.

In order to solve the above-mentioned problems and to achieve the object, according to the invention, there is provided a method for processing time-series data including a plurality of data items. The data processing method includes: a step of identifying a type of a data item in which the data is stored, using an overlap pattern indicating the type of the data item and a method for identifying the type; a step of processing the data stored in the data item, using calculation designated for each type of the data item, and adding a new data item to the type of the data item storing the processed data; and a step of calculating a score obtained by quantifying an amount of information displayed on a display screen for the data items including the added data item and arranging the data items on the basis of the scores.

In addition, the invention also provides a data processing device that performs the data processing method.

According to the invention, it is possible to automate the selection of a data item and the designation of a display order.

BRIEF DESCRIPTION OF THE DRAWINGS

FIG. 3 is a diagram illustrating an example of a type identification information table of the processing device according to Embodiment 1.

FIG. 4 is a diagram illustrating an example of an arithmetic processing information table of the processing device according to Embodiment 1.

FIG. 5 is a diagram illustrating an example of an input data information table of the processing device according to Embodiment 1.

FIG. 6 is a diagram illustrating an example of a data processing information table of the processing device according to Embodiment 1.

FIG. 7 is a diagram illustrating an example of the process flow of a data processing program of the processing device according to Embodiment 1.

FIG. 12 is a diagram illustrating an example of a data item information table of the processing device according to Embodiment 2.

FIG. 13 is a diagram illustrating an example of a data processing information table of the processing device according to Embodiment 2.

FIG. 14 is a diagram illustrating an example of the process flow of a data access program of the processing device according to Embodiment 2.

FIG. 15 is a diagram illustrating an example of the process flow of an analysis calculation program of the processing device according to Embodiment 2.

MODE FOR CARRYING OUT THE INVENTION

Figure 1:
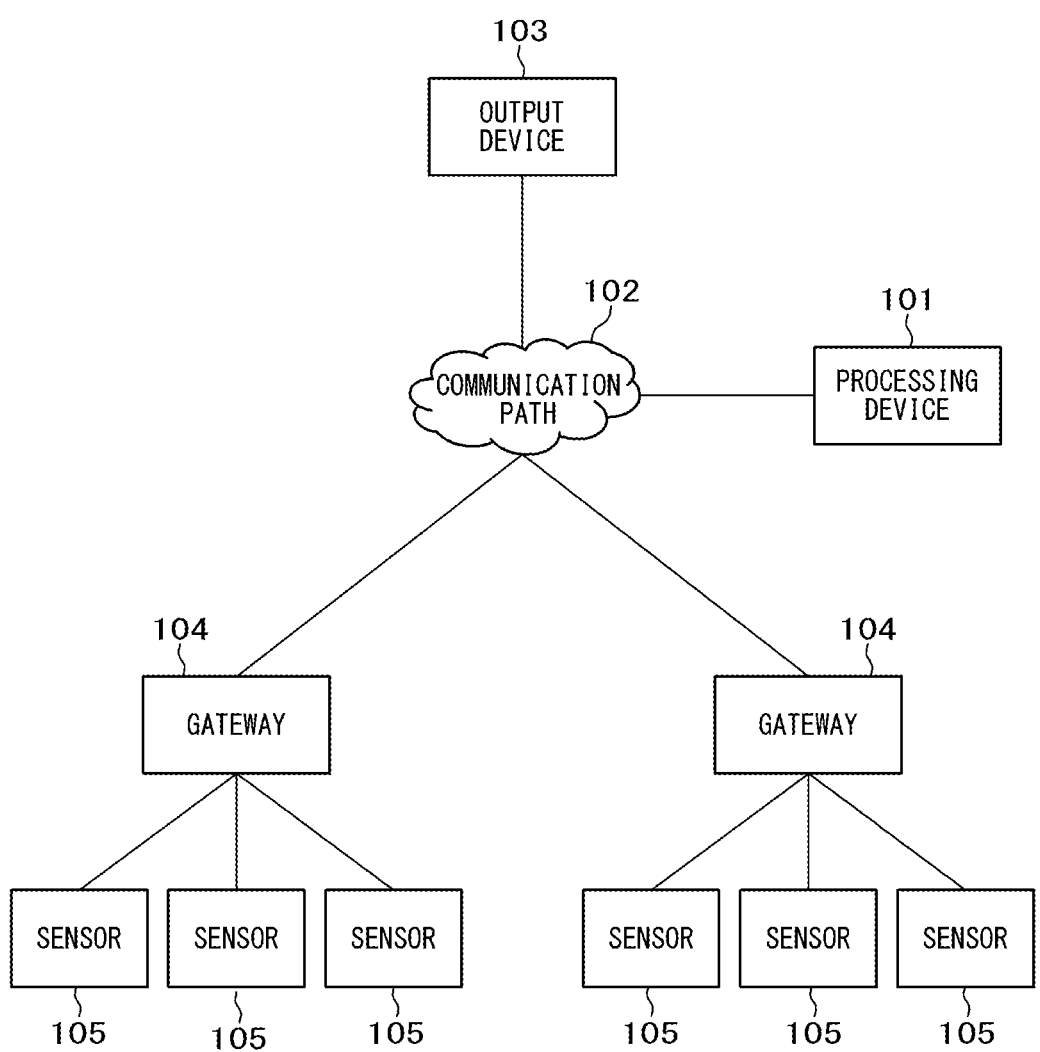
FIG. 1 is a diagram illustrating an example of the configuration of a system according to Embodiment 1.

Hereinafter, embodiments of the invention will be described with reference to the drawings.

In the description of the following embodiments, for convenience, the invention is divided into a plurality of sections or embodiments if necessary. These sections or embodiments are related to each other and one of them is, for example, a modification example, a detailed example, and a supplementary explanation of some or all of the others unless otherwise stated.

In the following embodiments, for example, in a case in which the number of elements (including the number of elements, a numerical value, an amount, and a range) is described, the number of elements is not limited to a specific value except a case in which the number of elements is particularly specified and a case in which the number of elements is clearly limited to a specific value in principle. The number of elements may be equal to or greater than the specific value or may be equal to or less than the specific value.

In the following embodiments, components (including, for example, element steps) are not necessarily essential except a case in which the components are particularly specified and a case in which the components are considered to be absolutely essential in principle.

The following embodiments may be independently applied or some or all of the embodiments may be combined and applied.

Embodiment 1

(IoT Production Monitoring System in Factory)

In this embodiment, there is provided an IoT production monitoring system which is installed in a factory and includes a facility sensor, an IoT gateway, a processing device, and an output device. The processing device identifies the type of a facility operation data item in which facility operation data acquired from the IoT gateway is stored, using an overlap pattern indicating the type of the facility operation data item storing the facility operation data and a method for identifying the type, performs processing, such as conversion, for the data stored in the data item, using calculation designated for each type of data item, and adds a new data item to the type of the data item storing the processed data. The processing device acquires display time period information including a monitoring start time and a monitoring end time from the output device and calculates a score obtained by quantifying the amount of information displayed on a display screen for data in the data items including the added data item for the display time period and other time periods. The processing device groups the data items on the basis of the added data item and the data item before the addition and arranges the groups on the basis of a difference between the score of the data item included in the group for the display time period and the score for other time periods. The processing device provides the data item in the upper Group among the arranged groups to the output device.

In addition, the output device receives an operation of adjusting arrangement from the user of the production monitoring system and presents the operation to the processing device. The processing device stores the adjustment of arrangement by the received user's operation as a coefficient of the data item. When calculating the score obtained by quantifying the amount of information displayed on the display screen, the processing device corrects the score with the coefficient and arranges the data items on the basis of the difference between the corrected scores.

As illustrated in FIG. 1, the system according to this embodiment includes a processing device 101, a communication path 102, an output device 103, an IoT gateway (hereinafter, referred to as a gateway 104), and a facility sensor (hereinafter, referred to as a sensor 105). The gateway 104 collects facility operation data acquired from the sensor 105, shapes the facility operation data, and transmits the facility operation data to the processing device 101 through the communication path 102. The processing device 101 selects a data item to be displayed and transmits processed data to the output device 103 through the communication path 102. The output device 103 visualizes the data received from the processing device 101 and receives feedback from a user. As illustrated in FIG. 1, the processing device 101 and the output device 103 may be independent devices or may be integrated into one device. The communication path 102 may be a wired or wireless network or may be a plurality of independent networks.

Figure 2:
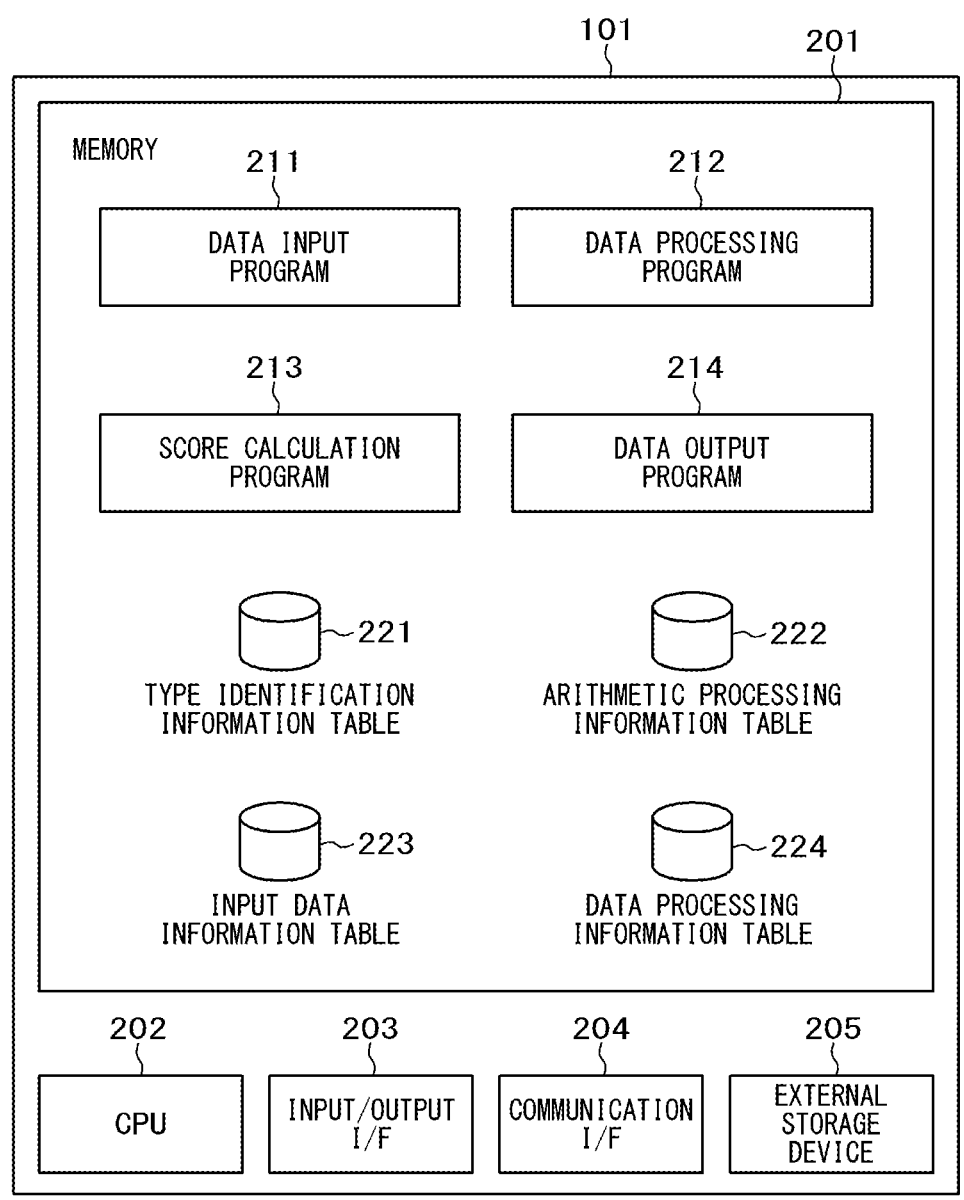
FIG. 2 is a diagram illustrating an example of the configuration of a processing device according to Embodiment 1.

FIG. 2 illustrates an example of the configuration of the processing device 101 according to this embodiment. The function of the processing device 101 according to this embodiment is stored in an external storage device 205 of a general computer in the form of program software, is developed in a memory 201, and is performed by a CPU 202. In addition, the processing device 101 is connected to the output device 103 and the gateway 104 through an input/output interface 203, a communication interface 204, or both the input/output interface 203 and the communication interface 204. The memory 201 of the processing device 101 stores a data input program 211 that receives facility operation data from the gateway 104, a data processing program 212 that processes the received data in a predetermined order, a score calculation program 213 that calculates a score obtained by quantifying the amount of information to be displayed on a display screen, and a data output program 214 that transmits the processing result of the data to the output device 103. The memory 201 of the processing device 101 further stores a type identification information table 221 that stores information for identifying the type of data item, an arithmetic processing information table 222 that stores information related to data calculation performed for each type, an input data information table 223 that stores data to be processed, and a data processing information table 224 that stores information which is referred to when data is processed.

The processing device 101 according to this embodiment has the configuration in which the programs and the information are stored in the memory of a single computer. However, the information may be stored in an external storage device, may be read from the external storage device whenever the process of the program is performed, and may be stored in the external storage device whenever each process is completed.

In addition, the programs and the information may be dispersively stored in a plurality of computers. For example, each of the information items may be stored as a table of a database in a database server different from the processing device 101 and the program executed in the processing device 101 may refer to the information in the database server and may update the information.

The program may be incorporated into, for example, a ROM in advance and then provided. Alternatively, the program may be recorded as an installable or executable file on a computer-readable (non-transitory) recording medium, such as a CD-ROM, a CD-R, or a digital versatile disk (DVD), and may be provided or distributed. In addition, the program may be stored in a computer that is connected to a network, such as the Internet, may be downloaded through the network, and may be provided or distributed.

FIG. 3 illustrates an example of the type identification information table 221 stored in the processing device 101. The type identification information table 221 stores an overlap pattern indicating the type of data item in which data is stored and a method for identifying the type. Type identification information includes a type ID 301 that indicates a type identifier, a type name 302 that indicates the name of a type, and an identification method 303 indicating a method for identifying the type. FIG. 3 illustrates an example of a method for identifying whether a character string which is the content of data corresponding to the type of measured value and the type of time, using regular expression. In addition, the type of data may be determined by a method using the relationship between a threshold value and the calculation result of a predetermined function, such as a data overlap pattern or the statistical variance of the content of data, or the result of executing an external program using the content of data as a parameter.

FIG. 4 illustrates an example of the arithmetic processing information table 222 stored in the processing device 101. Arithmetic processing information includes a process ID 401 indicating an identifier of a processing method, a type 402 indicating the type of processing target, and arithmetic processing content 403 indicating a specific step of arithmetic processing. In addition to the type name 302 of the type identification information table 221, the type ID 301 may be used as the type 402. The arithmetic processing content 403 may be an identifier (a function name, a library name, a file name, or a URL) indicating an internal or external data processing function, in addition to the content of a function of processing target data using a program language.

FIG. 5 illustrates an example of the input data information table 223 stored in the processing device 101. Input data information includes a data ID 501 which is a data identifier, a generation time 502 indicating a data generation time, a data source 503 indicating a reception source of data, and data items 504 indicating the content of a plurality of data items. The data source 503 may be, for example, an identifier formed by an arbitrary character string or the address of the gateway 104. FIG. 5 illustrates an example in which data received from a plurality of data sources 503 is stored in one table, using the characteristics in which a plurality of rows of the same table have different numbers of columns, in implementation using a non-relational database (NoSQL). In addition, in implementation using a relational database (RDB), columns have the same structure in the same table. Therefore, there are a plurality of input data information tables 223 and input data may be stored in different tables according to the data sources 503. The data item 504 illustrated FIG. 5 shows an example in which, when a plurality of data items are received from the gateways 104 in a predetermined order, the values of each data item are stored in the order. In addition, when the name information of each data item is also received from each gateway 104, a pair of the name and the value may be stored in the data item 504.

FIG. 6 illustrates an example of the data processing information table 224 stored in the processing device 101. Data processing information includes an item ID 601 indicating an identifier of a data item, a type 602 indicating an identifier of the type of data item, an arithmetic result 603 indicating the content of arithmetic processing performed for a data item and an identifier of a data item of the result of the arithmetic processing, a score 604 indicating the amount of information provided when the content of a data item is displayed, a coefficient 605 indicating the result of the user's operation for the display screen, and an order 606 indicating the display order of data items. The item ID 601 is a combination of the data source 503 and the order of a data item as illustrated in FIG. 6 and may be another identifier that can specify a data item. The type 602 may be the type name 302 of the type identification information table 221 or the type ID 301. The arithmetic result 603 is a combination of the process ID 401 indicating identifiers of a plurality of arithmetic processing operations performed for a data item and the identifier item 601 of the result. FIG. 6 illustrates an example in which an input data item 607 and an arithmetic result item 608 are stored in the same table. In addition, the data processing information of the input data item 607 and the data processing information of the arithmetic result item 608 may be stored in different tables.

The data input program 211 executed by the processing device 101 performs information exchange with the gateway 104 through the input/output interface 203, the communication interface 204, or both the input/output interface 203 and the communication interface 204 to acquire the information of the sensor 105. As an example of a method for implementing the function, the gateway 104 shapes the stored latest information of the sensor 105 at a predetermined time interval or in response to a specific signal from the sensor 105 as a trigger, creates a data transmission message, and transmits the data transmission message to the data input program 211. When acquiring the data transmission message, the data input program 211 stores the content of the data transmission message in the input data information table 223. As another method for implementing the function, the data input program 211 may transmit a data acquisition request message to the gateway 104 and the gateway 104 may respond to the data acquisition request message.

FIG. 7 illustrates an example of the detailed process flow of the data processing program 212 executed by the processing device 101. In Step 701, when new data is stored in the input data information table 223, the processing device 101 executes the data processing program 212. In Step 702, the data processing program 212 of the processing device 101 acquires the newly stored input data from the input data information table 223. Then, in Step 703, the data processing program 212 of the processing device 101 extracts data from the same data source as that of the input data from the input data information table 223 and determines whether the source of the acquired data is a new source. When it is determined that the source of the data is not a new source (Step 703; No), the data processing program 212 of the processing device 101 proceeds to Step 704 and determines whether a data item has been changed, for example, whether the number of data items has increased or decreased, with reference to the data processing information table 224.

In a case in which it is determined in Step 703 that new data is stored (Step 703; Yes) or in a case in which it is determined in Step 704 that the data item has been changed (Step 704; Yes), the data processing program 212 of the processing device 101 performs a process of identifying the type of each data item of the input data in Step 705. As an example of a specific process of identifying the type, first, the data processing program 212 removes data information related to the same data source from the data processing information table 224 and newly prepares the row of the input data 607. Then, the data processing program 212 tests the content of each data item of the input data for each type in the type identification information table 221 from the upper side, using the method indicated by the identification method 303. In a case in which the test has succeeded (for example, in a case in which the content corresponds to regular expression, in a case in which the calculation result of a test function is greater than a threshold value, or in a case in which a return code of an external program is a predetermined value), the data item is recorded as a corresponding type in the type 602 in the row of the corresponding item ID 601 of the data processing information table 224. Then, arithmetic processing information in which the type 402 is matched with the type of data item is extracted from the arithmetic processing information table 222 and the additional data 608 is newly added to each arithmetic processing information item in the data processing information table 224 and is additionally written to the arithmetic result 603 of the input data. In a case in which the test has failed, the test is performed for the next type in the type identification information table 221. In a case in which the test has failed in all of the types in the type identification information table 221, the type of the data item is set to "unknown".

After Step 705 is completed or in a case in which it is determined in Step 704 that there is no change in the data item (Step 704: No), the data processing program 212 of the processing device 101 performs arithmetic processing for each data item. As an example of the detailed procedure of the arithmetic processing, first, the row of the input data 607 corresponding to processing target data is extracted from the data processing information table 224. Then, for the data items corresponding to each row, arithmetic processing in the arithmetic result 603 is extracted from the arithmetic processing information table 222 and the arithmetic processing content 403 is performed. Then, the result is recorded in the data item 504 corresponding to the arithmetic result 603 in the input data information table 223.

Finally, in Step 707, the processing device 101 ends the data processing program 212.

Figure 8:
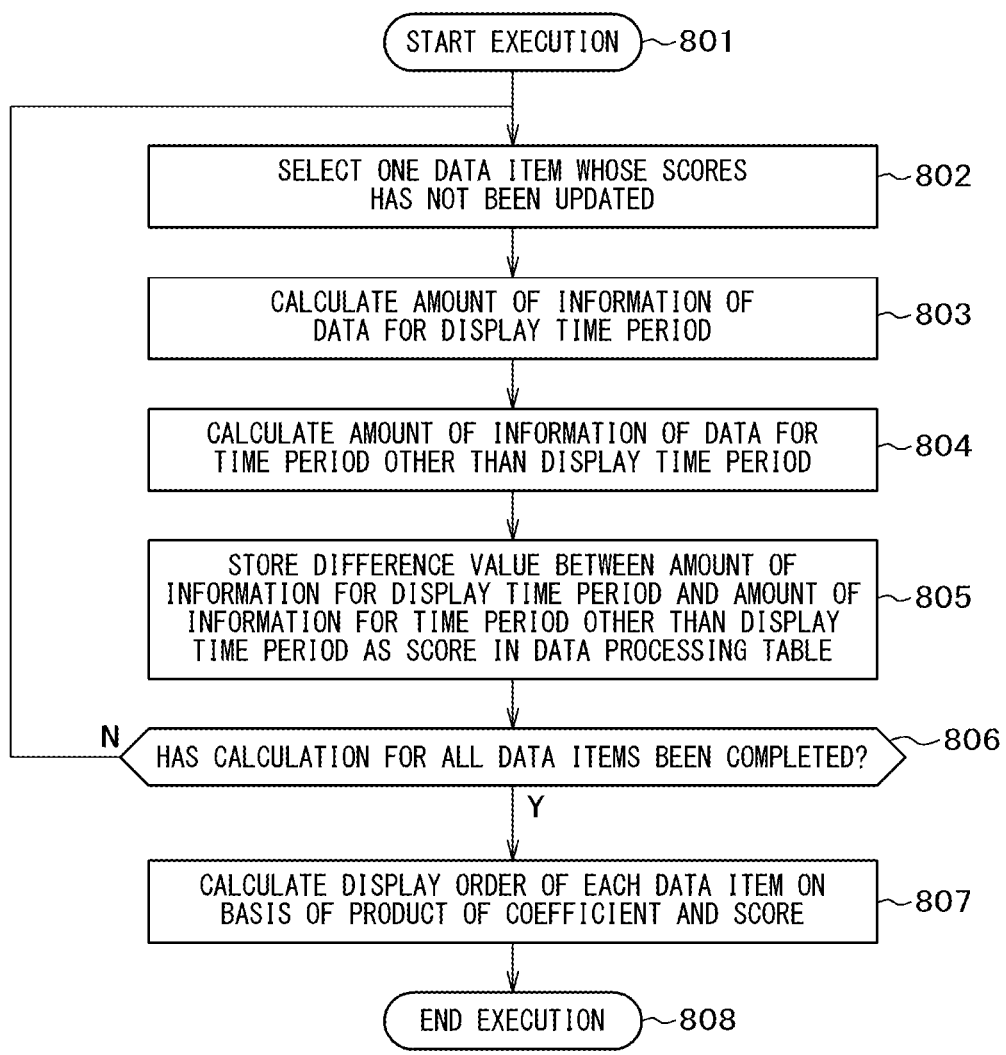
FIG. 8 is a diagram illustrating an example of the process flow of a score calculation program of the processing device according to Embodiment 1.

FIG. 8 illustrates an example of the detailed process flow of the score calculation program 213 executed by the processing device 101. In Step 801, in the processing device 101, the data output program 214 operates the score calculation program 213. In Step 802, the score calculation program 213 of the processing device 101 sequentially selects one data item whose score has not been updated and which includes the input data item 607 and the additional data item 608 from the data processing information table 224.

Then, in Step 803, on the basis of display time period information including a monitoring start time and a monitoring end time which has been acquired by the data output program 214, the score calculation program 213 of the processing device 101 calculates the amount of information s1 provided by displaying data for the time period of the selected data item. Then, in Step 804, the processing device 101 calculates the amount of information s2 provided by displaying data other than the time period of the selected data item, on the basis of the display time period information acquired by the data output program 214. Then, in Step 805, the processing device 101 stores the calculation result of a difference s1-s2 between the amounts of information as the score 604 in the data processing information table 224.

As an example of the method for calculating the amount of information, a statistical distribution of data can be created and the logarithm of the variance of the statistical distribution can be calculated. This is because logarithm arithmetic gives meaning to the difference s1-s2 between the amounts of information. That is, the score can be represented by the following Expression 1.

[Expression 1]

$$\text{Score }(s) = s1 - s2 = lg(\sigma_1^2) - lg(\sigma_2^2) = 2lg\left(\frac{\sigma_1}{\sigma_2}\right) \quad \text{(Expression 1)}$$

As another example of the method for calculating the amount of information, spectrum analysis using Fourier transform can be performed for data and a frequency range in which a spectrum is equal to or greater than a predetermined value can be calculated. In addition, other indexes may be calculated as the amount of information.

Then, in Step 806, the score calculation program 213 of the processing device 101 determines whether the score calculation for all of the data items has been completed. When it is determined that the score calculation for all of the data items has not been completed (Step 806; No), the score calculation program 213 returns to Step 802 and selects the next data item. When it is determined that the score calculation for all of the data items has been completed (Step 806; Yes), the score calculation program 213 proceeds to Step 807, calculates the display order of the data items on the basis of the product of the score 604 and the coefficient 605, and stores the result in the order 606. As a method for calculating the display order, the display order may be determined on the basis of the product of the coefficient 605 of the score 604 of each data item including the input data 607 and the additional data 608. Alternatively, the additional data 608 in which the input data 607 is described in the arithmetic result 603 may be grouped and the display order of the groups may be determined, using the maximum value of the product of the score 604 and the coefficient 605 in each group as a representative value of the group. Alternatively, the display order of the groups may be determined on the basis of the product of the score 604 and the coefficient 605 in each group. FIG. 6 illustrates an example in which three data items "GW1-1" (product: 76), "GW1-1-1" (product: 114), and "GW1-1-2" (product: 56) form a group, the display order (first place) of the groups is determined on the basis of the maximum value (114) of the product, and the display order (the second place, the first place, and the third place) of the groups is determined on the basis of each product.

Finally, in Step 808, the processing device 101 ends the score calculation program 213.

The data output program 214 executed by the processing device 101 performs information exchange with the output device 103 through the input/output interface 203, the communication interface 204, or both the input/output interface 203 and the communication interface 204 to implement, for example, a function of receiving a data output request, a function of providing processed data, and a function of giving feedback on the user's operation. As an example of a method for implementing the functions, the output device 103 transmits a data display request including the display time period from the start time to the end time to the processing device 101 and the processing device 101 processes the request received by the data output program 214, executes the score calculation program 213 to acquire the corresponding data item within the display time period from the input data information table 223 on the basis of the display order, and transmits the data item to the output device 103. Alternatively, the output device 103 transmits the operation behavior of the user to the processing device 101 and the processing device 101 processes a behavior record received by the data output program 214 and adjusts the coefficient 605 in the data processing information table 224. For example, the communication of a message using a predetermined protocol, such as Hyper Text Protocol (HTP), can be used for information exchange between the data output program 214 and the output device 103.

Figure 9:
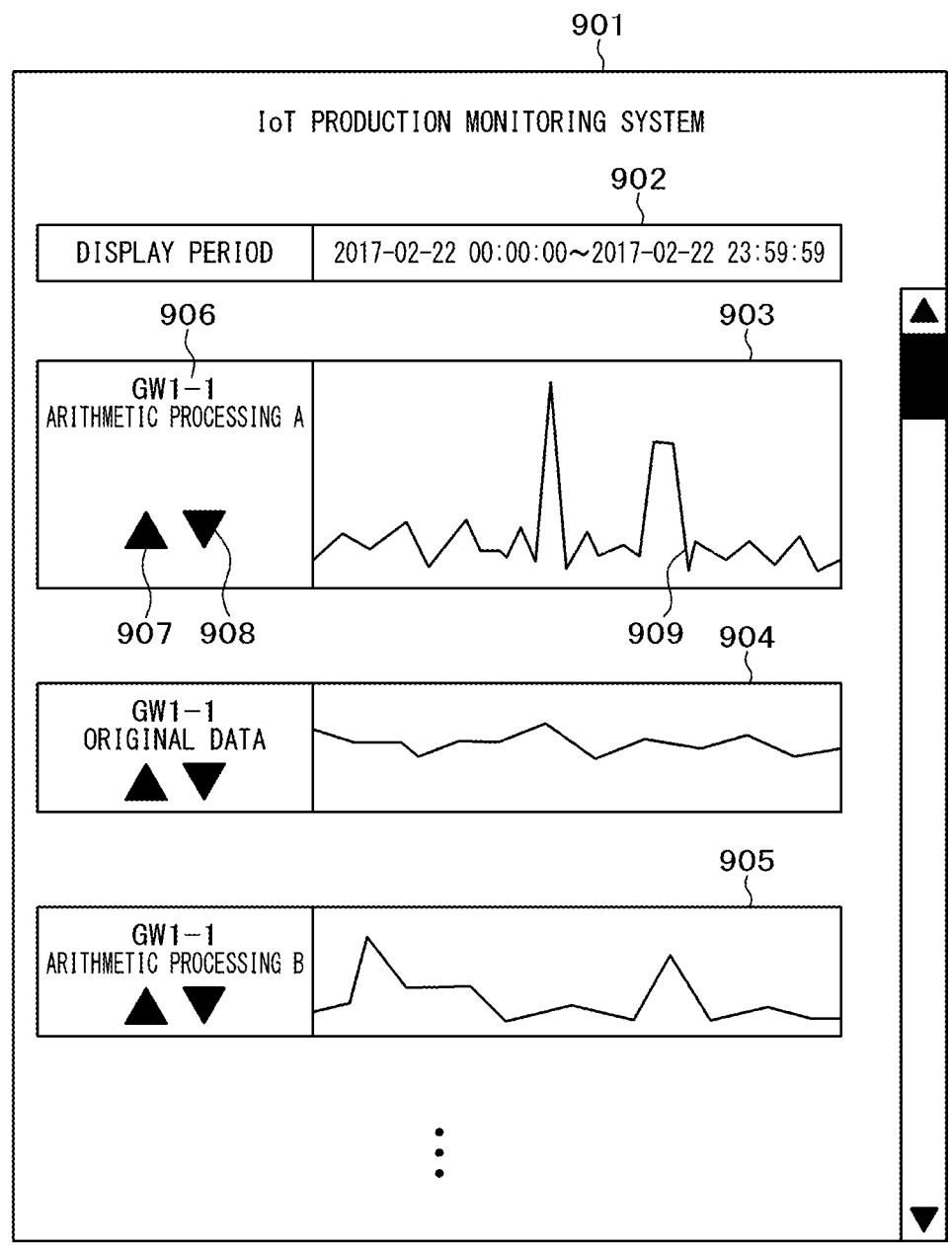
FIG. 9 is a diagram illustrating an example of a data output screen in Embodiment 1.

FIG. 9 illustrates an example of an IoT production monitoring system screen which is output from the output device 103. An IoT production monitoring system screen 901 includes basic information including a display period 902 and a plurality of data item graphs. A graph 903, a graph 904, and a graph 905 correspond to "GW1-1-1", "GW1", and "GW1-1-2" in the data processing information table 224 illustrated in FIG. 6, respectively. The content of the data item graph will be described, using the graph 903 as an example. The graph 903 includes a data item title 906 including a data source and a processing method, buttons 907 and 908 that can be operated by the user to adjust the ranking of the graphs, and a data visualization result 909 within the display time period. For example, whenever the user operates the button 907, the corresponding graph on the screen moves up in the ranks and the output device 103 transmits a behavior record to the processing device 101. The processing device 101 multiplies the coefficient 605 of the corresponding data item by a multiplying factor that is equal to or greater than 1 (for example, 1.5) and performs arrangement. In addition, for example, whenever the user operates the button 908, the corresponding graph on the screen moves down in the ranks and the output device 103 transmits a behavior record to the processing device 101. The processing device 101 multiplies the coefficient 605 of the corresponding data item by a multiplying factor that is equal to or less than 1 (for example, 0.5) and performs arrangement. In the above-mentioned example, the rankings of the graphs are arranged. However, an operation for the button 907 or 908 may not be received and a fixed display process of fixedly displaying the arranged graphs may be performed or the arranged graphs may not be displayed. In the case of the fixed display process, the multiplying factor is set to 1. In the non-display process, the multiplying factor is set to 0. The coefficient 605 multiplied by the multiplying factor set in the arrangement process, the fixed display process, or the non-display process is stored as a new coefficient of the data item.

As such, according to this embodiment, for time-series data including a plurality of data items, the flow of a series of processes including the selection of a data item, data processing, and the designation of a display method is automated. Therefore, it is possible to rapidly monitor and analyze valuable data. Specifically, in this embodiment, there is provided an IoT production monitoring system which is installed in a factory and includes a facility sensor, an IoT gateway, a processing device, and an output device. The processing device identifies the type of a data item in which facility operation data acquired from the IoT gateway is stored, performs processing, such as conversion, for the data stored in the data item, and adds a new data item to the type of the data item storing the processed data. The processing device acquires display time period information including a monitoring start time and a monitoring end time from the output device and calculates a score obtained by quantifying the amount of information displayed on a display screen for data in each of the data items including the added data item for the display time period and other time periods. The processing device groups the data items on the basis of the added data item and the data item before the addition and arranges the groups on the basis of a difference between the score of the data item included in the group for the display time period and the score for other time periods. The processing device provides the data item in the upper group among the arranged groups to the output device. With this configuration, for time series data including a plurality of data items, it is possible to automate the flow of a series of processes including the selection of a data item, data processing, and the designation of a display method.

In addition, the output device receives an operation of adjusting arrangement from the user of the production monitoring system and presents the operation to the processing device. The processing device stores the received user's operation as a coefficient of the data item. When calculating the score obtained by quantifying the amount of information displayed on the display screen, the processing device corrects the score with the coefficient and arranges the data items on the basis of the difference between the corrected scores. Therefore, it is possible to store feedback on the monitoring of data by the user and to further improve the visualization of the subsequent data output.

In addition, for example, the operating facility can be changed to acquire a new data item from the IoT gateway. In this case, for the new data item, the processing device 101 may calculate the relation between the new data item and the existing data item before addition, using at least one of the generation source of data, the type of the new data item, the statistical distribution of the data (for example, a statistical distribution by the method for calculating the amount of information represented by the above-mentioned Expression 1), and the spectrum characteristics of the data (for example, the characteristics of data obtained by spectrum analysis using Fourier transform which has been described as another example of the method for calculating the amount of information), and may calculate the initial coefficient 605 of the new data item, using the relation and the coefficient 605 of the existing data item. In this case, even when production adjustment, such as a change in the operating facility, occurs, it is possible to take over the adjustment result related to data monitoring.

In the data processing program 212 according to this embodiment, when the type identification test for all of the data items fails, the types of the data items are set to "unknown". As such, when a data item of the "unknown" type appears, for example, a test failure event, a data source, and the outline of data may be recorded such that an administrator can create new type identification information corresponding to the data item and can update the type identification information table 221. In this case, it is possible to sequentially expand the response capability of the system during operation, using input data.

Then, when the score calculation program 213 updates the score of the data item or when the data output program 214 transmits output data to the output device 103, only some data that rank high can be processed. For example, the score calculation program 213 may set a threshold value to at least one index of the score obtained by quantifying the amount of information displayed on the display screen and the rankings of the result of arranging the data items on the basis of the scores, exclude the data item in which the value of the index is less than the threshold value from the subsequent data processing, and perform a process for only some data that rank high. In this case, it is possible to reduce the data processing time or the amount of traffic of the communication path 102 and thus to improve the performance of the system.

In the example illustrated in FIG. 6, one coefficient 605 and one order 606 are provided for each data item. However, in a case in which there are a plurality of users and the identifiers (for example, user IDs or passwords) of the users can be acquired from the output device 103, the coefficient 605 and the order 606 may be provided for each user. In this case, the preference of each of the plurality of users for data monitoring is stored, which makes it possible to further improve the visualization of data output in the subsequent process.

In a production monitoring system corresponding to a plurality of users, a user can be added. In this case, when a new data user is added, it is possible to calculate the initial coefficient 605 of the new user, on the basis of the average value of the coefficients 605 of a plurality of users that have been registered in the system. For example, the processing device 101 may calculate the average value of the coefficients of the same data items of all of the users that have been registered in the system and may use the calculated average value as the initial coefficient 605 of the data item of the new user. In this case, it is possible to calculate the score obtained by quantifying the amount of information displayed on the display screen for the new user, to correct the score with the initial coefficient 605, and to calculate the initial order 606 of the data item on the basis of the corrected score. In this case, the new user can use the adjusted data monitoring output and it is possible to reduce the number of user setup processes.

Embodiment 2

(Product Defect Cause Analysis System)

In this embodiment, there is provided a product defect cause analysis system including a processing device, a communication path, an output device, and a production recording device. The processing device identifies the type of a production recording data in which production recording data acquired from the production recording device is stored, using an overlap pattern indicating the type of the production recording data item storing the production recording data and a method for identifying the type, performs processing, such as conversion, for the data stored in the data item, using calculation designated for each type of data item, and adds a new data item to the type of the data item storing the processed data. The processing device acquires defect occurrence time information, detects a change point of data stored in the data items including the added data item for a predetermined time period before and after the occurrence time, calculates a score obtained by quantifying the amount of information, using the number of change points for the time period, and arranges the data item on the basis of the score. The processing device provides a data item that ranks high among the arranged data items as a main cause item of a production defect, provides a time period for which the change point of the data item that ranks high occurs as a defect influence time period, provides a variance of a statistical distribution of the scores of the data items as an index for the significance of arrangement, and provides a difference between the scores for the time periods as an index for the significance of data.

Figure 10:
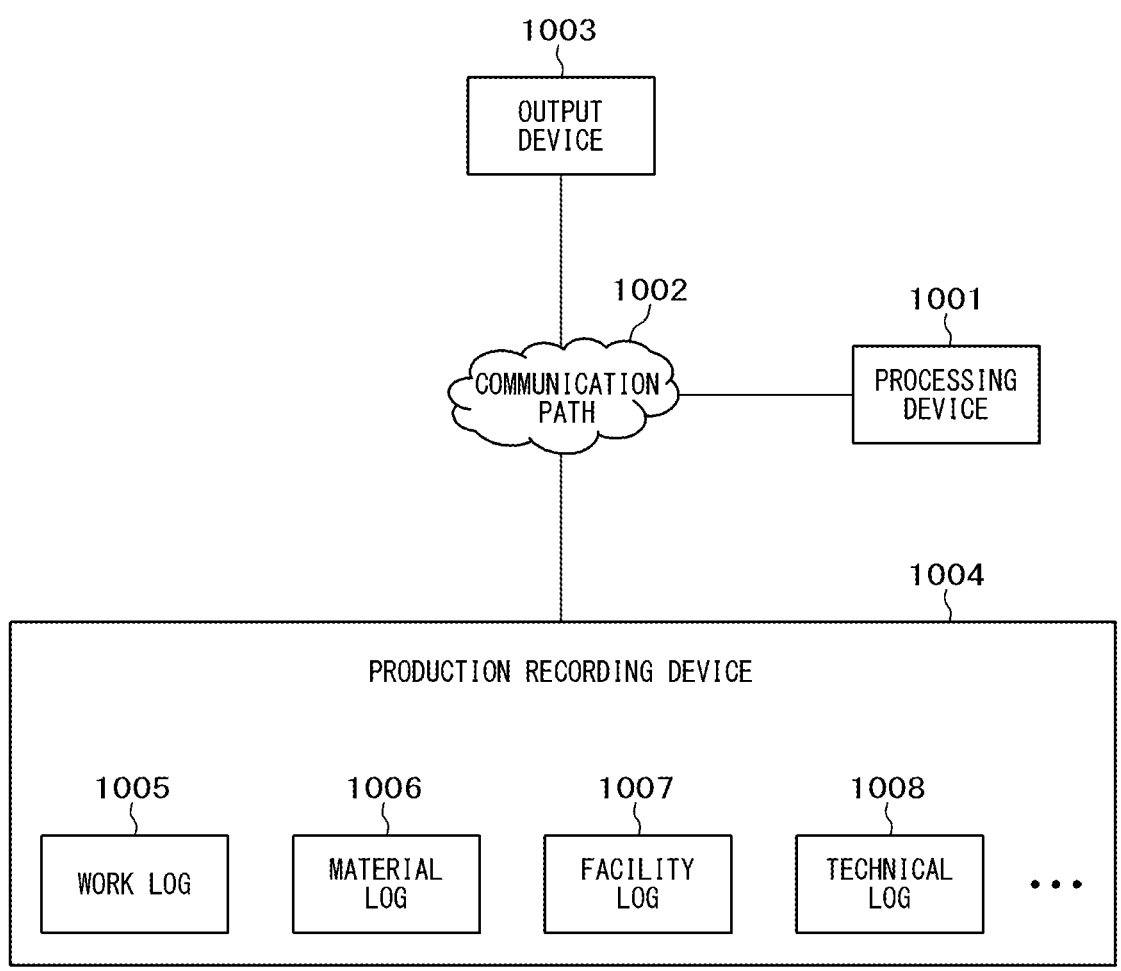
FIG. 10 is a diagram illustrating an example of the configuration of a system according to Embodiment 2.

The configuration of the system according to this embodiment will be described with reference to FIG. 10. In addition, the description of the same content as that in Embodiment 1 will not be repeated. The system according to this embodiment includes a processing device 1001, a communication path 1002, an output device 1003, and a production recording device 1004. The production recording device 1004 records various kinds of data related to production, such as a work log 1005, a material log 1006, a facility log 1007, and technical data 1008. The production recording device 1004 may be a single server device or a system including a plurality of servers.

Figure 11:
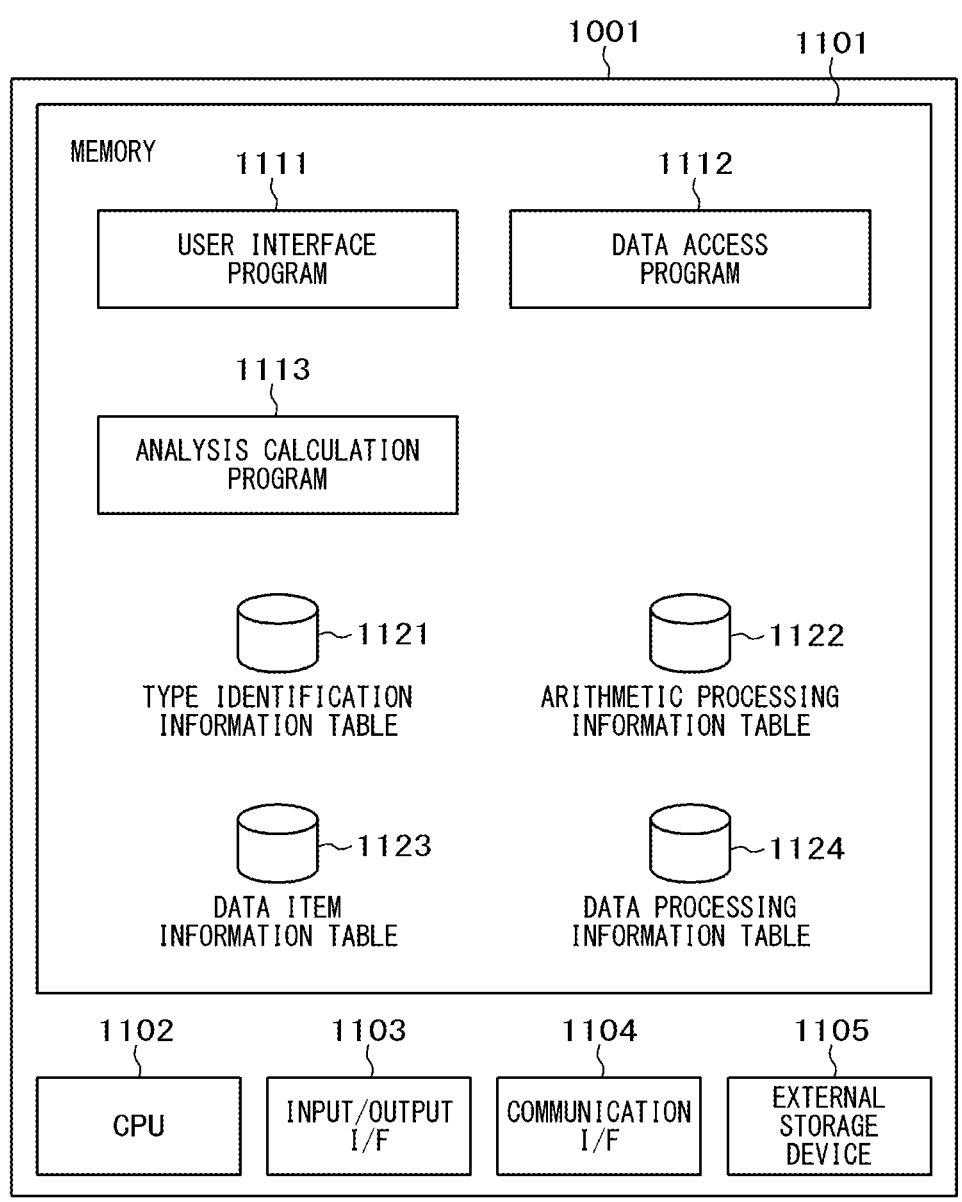
FIG. 11 is a diagram illustrating an example of the configuration of a processing device according to Embodiment 2.

An example of the configuration of the processing device 1001 according to this embodiment will be described with reference to FIG. 11. In addition, the description of the same content as that in Embodiment 1 will not be repeated. A memory 1101 of the processing device 1001 stores a user interface program 1111 that performs information exchange with the output device 1003, a data access program 1112 that performs information exchange with the production recording device 1004, and an analysis calculation program 1113 that performs an analysis process. In addition, the memory 1101 of the processing device 1001 stores a type identification information table 1121 that stores information for identifying the type of data item, an arithmetic processing information table 1122 that stores information related to a data operation for each type, a data item information table 1123 that stores identified data items, and a data processing information table 1124 that stores information which is referred to when data is processed.

FIG. 12 illustrates an example of the data item information table 1123 stored in the processing device 1001. Data item information includes a data source 1201 indicating data classification in the production recording device 1004, an item ID 1202 indicating an identifier of a data item in the production recording device 1004, a type 1203 indicating the type of data item, and arithmetic processing content 1204 indicating a specific step of arithmetic processing for a data item. The processing device 1001 stores the identification result of a data item in the production recording device 1004 in the data item information table 1123.

FIG. 13 illustrates an example of the data processing information table 1124 stored in the processing device 1001. Data processing information includes an item ID 1301 indicating an identifier of a data item and scores 1302 related to a plurality of time periods. The item ID 1301 may be the same as the item ID 1202 or may be an identifier for specifying another data item.

The user interface program 1111 executed by the processing device 1001 performs information exchange with the output device 1003 through the input/output interface 1103, the communication interface 1104, or both the input/output interface 1103 and the communication interface 1104 to implement a function of receiving a data analysis request and a function of providing a data analysis result. As an example of a method for implementing the functions, the output device 1003 transmits a data analysis request including information (for example, a product serial number) that can specify a production time and a production line to the processing device 1001 and the processing device 1001 processes the request received by the user interface program 1111 and transmits the analysis result to the output device 1003.

FIG. 14 illustrates an example of the detailed process flow of the data access program 1112 executed by the processing device 1001. In Step 1401, the processing device 1001 receives the data analysis request, using the user interface program 1111, and executes the data access program 1112. In Step 1402, the processing device 1001 transmits information (for example, a product serial number) that can specify the production time and the production line to the production recording device 1004 and acquires a list of data items related to production time information. Then, in Step 1403, the processing device 1001 determines whether a data item that is not included in the data item information table 1123 is present in the list of the related data items. When a new data item is present, the processing device 1001 identifies the type of the new data item in Step 1404. After the process of identifying the type of the new data item is completed or when no new data items are present, the processing device 1001 initializes the data processing information table 1124 in Step 1405. As an example of a detailed initialization method, the processing device 1001 creates rows corresponding to the item ID 1202 of the related data item and the item ID of an additional data item in the arithmetic result 1204 in the data processing information table 1124. Finally, in Step 1406, the processing device 1001 ends the data access program 1112 and executes the analysis calculation program 1113.

FIG. 15 illustrates an example of the detailed process flow of the analysis calculation program 1113 executed by the processing device 1001. In Step 1501, the processing device 1001 executes the analysis calculation program 1113. In Step 1502, the processing device 1001 selects one data item in order from the data processing information table 1124. Then, in Step 1503, the processing device 1001 determines whether the selected data item has been registered in the production recording device 1004 or has been added by calculation. In a case in which the selected data item has been added, the processing device 1001 proceeds to Step 1504, acquires data of the original data item of the data item from the production recording device 1004, and performs a designated arithmetic processing. In a case in which the selected data item has been registered, the processing device 1001 proceeds to Step 1505 and acquires data of the data item from the production recording device 1004. In both cases, in Step 1506, the processing device 1001 detects a change point from data in a time section which includes the lengths of a plurality of predetermined sections and has the production time acquired by the data access program 1112 as the center and calculates the number of change points in the length of a unit time as the score of the data item in the time section. As a method for detecting the change point, a known method, such as summary statistic, a subspace method, or a density ratio estimation method, is used. Then, in Step 1507, the processing device 1001 determines whether the score calculation has been performed for all of the data items. In a case in which there is a data item whose score has not been calculated, the processing device 1001 returns to Step 1502 and selects the next data item. In a case in which the score calculation for all of the data items has been completed, the processing device 1001 proceeds to Step 1508, searches for the maximum value from all of the scores, and stores the time section including the maximum value as a reference section. Then, in Step 1509, the processing device 1001 arranges the data items in order on the basis of the scores of the reference section. Then, in Step 1510, the processing device 1001 outputs, as the analysis results, the order of the data items, the reference section, the variance of the statistical distribution of the scores of the data items as an index for the significance of the order, and a difference between the time periods of the scores as an index for the significance of the reference section. For example, the processing device 1001 acquires the average value of the scores of a plurality of data items and time period information including the start time and the end time, calculates the average value of the time period indicated by the time period information or a difference between the average values of other time periods, and provides the calculated value as an index for the significance of data. Finally, in Step 1511, the processing device 1001 ends the analysis calculation program 1113.

Figure 16:
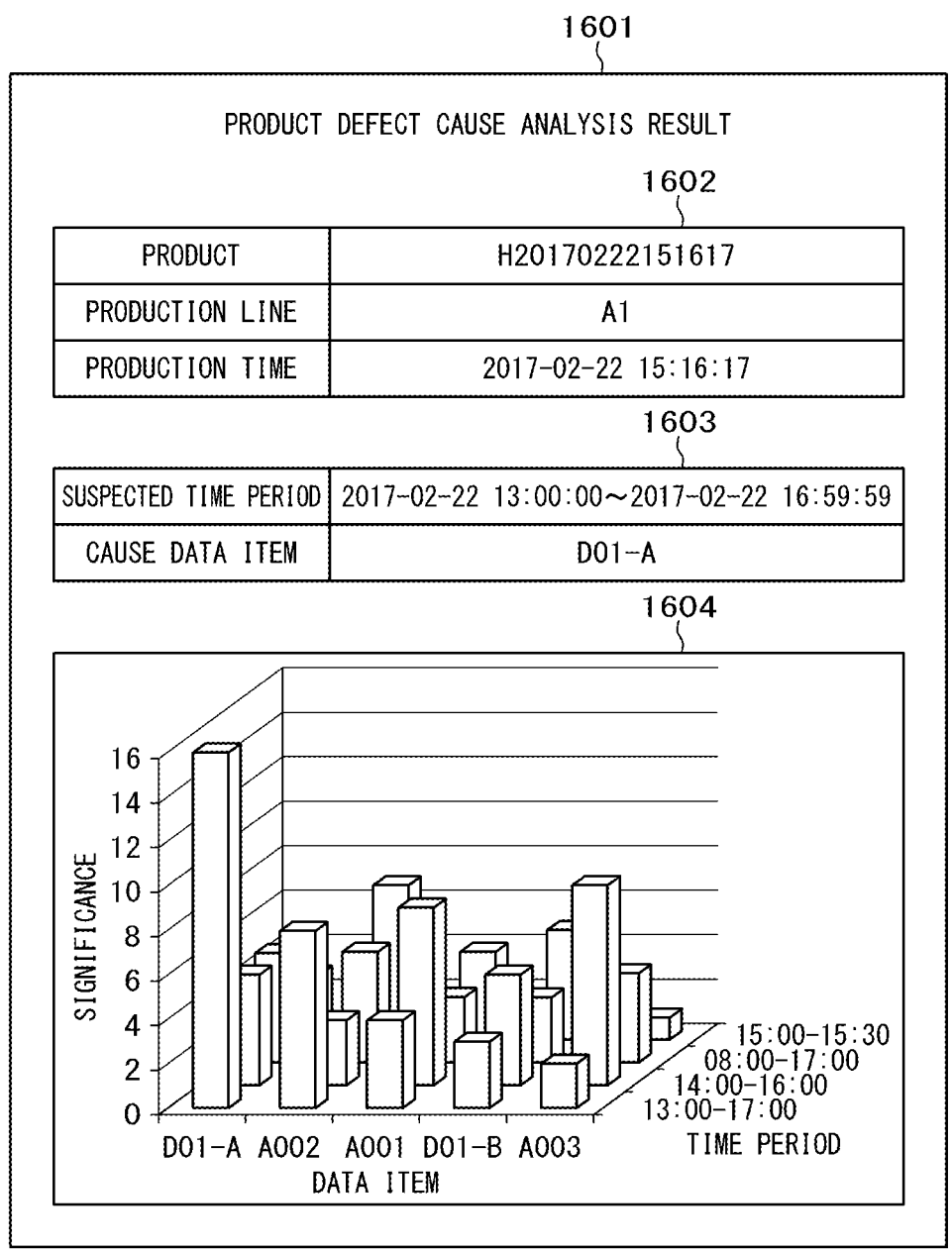
FIG. 16 is a diagram illustrating an example of an analysis result output screen in Embodiment 2.

FIG. 16 illustrates an example of the analysis results output from the output device 1003. An analysis result screen 1601 includes analysis target information 1602, analysis result information 1603, and analysis result significance information 1604. The analysis target information 1602 includes an identifier (for example, a product serial number) of an analysis target, and production time and production line information specified by the identifier. The analysis result information 1603 includes a reference section which is a suspected time period and a data item which has the maximum value of the score and is a cause data item. The analysis result significance information 1604 is a graph including the variance of the statistical distribution of the scores of the data items and a difference between the time periods of the scores as an index for the significance of the reference section.

According to this embodiment, it is possible to automatically analyze the relation between time-series data including a plurality of data items and an event that occurs at a specific time and the influence range of the event. In addition, an index for the significance of arrangement and an index for the significance of data are provided such that the user can intuitively determine the plausibility of the analysis results and can use the analysis results or determine whether to perform reanalysis on the basis of the indexes.

The invention claimed is:

1. A method for processing time-series data including a plurality of data items, comprising:
   identifying a type of a data item in which the data is stored, using an overlap pattern indicating the type of the data item and a method for identifying the type;
   processing the data stored in the data item, using calculation designated for each type of the data item, and adding at least one or more new data items to the type of the data item storing the processed data;
   determining, from the at least one or more new data items, which of the at least one or more new data items do not contain an updated score;
   selecting, from the at least one or more new data items that do not contain an updated score, a first data item that includes an input data item and an additional data item;
   acquiring time period information including a monitoring start time and a monitoring end time;
   calculating, for the at least one or more new data items that do not contain the updated scores, scores obtained by quantifying an amount of information displayed on a display screen for the at least one or more new data items that do not contain the updated scores including the added data items;
   calculating, for the at least one or more new data items that do not contain the updated scores, the scores which are displayed on the displayed for a time period indicated by the time period information and a time period other than the time period;
   arranging the data items including the at least one or more new data items on the basis of a difference between the scores for the time period and the scores for a time period other than the time period; and
   acquiring time information, detecting change points of data stored in the data items including the added data items for a predetermined time period before and after the occurrence time, calculating the scores using the numbers of change points for the time period, and arranging the data items on the basis of the scores.

2. The data processing method according to claim 1, further comprising:
   creating statistical distributions of data stored in the data items including the added data items, calculating variances of the created statistical distributions as the scores, and arranging the data items on the basis of the calculated scores; or performing spectrum analysis using Fourier transform for data stored in the data items including the added data items, calculating frequency ranges in which a spectrum is equal to or greater than a predetermined value as the scores, and arranging the data items on the basis of the calculated scores.

3. The data processing method according to claim 1, further comprising:

grouping the data items on the basis of the added data items and the related data items before the addition; and calculating the scores of the data items including the added data items and the data items before the addition which are displayed on the display screen and arranging the groups on the basis of a maximum value of the scores of the data items included in the groups.

4. The data processing method according to claim 1, further comprising:

calculating a variance of a statistical distribution of the scores of the plurality of data items and providing the variance as an index for significance of arrangement.

5. The data processing method according to claim 1, further comprising:

acquiring an average value of the scores of the plurality of data items and time period information including a start time and an end time, calculating the average value for a time period indicated by the time period information or a difference between the average values for time periods other than the time period, and providing the calculated value as an index for significance of data.

6. The data processing method according to claim 1, further comprising:

setting a threshold value to an index for at least one of the score and a ranking of the arrangement results and removing the data items in which a value of the index is less than the threshold value from subsequent data processing.

7. The data processing method according to claim 1, further comprising:

receiving an operation of adjusting at least one of fixed display, arrangement, and non-display from a user of the data in an output of the arrangement data items and storing the operation as a coefficient of the adjusted data item; and calculating the scores obtained by quantifying the amount of information displayed on the display screen, correcting the scores with the coefficient after the adjustment, and arranging the data items on the basis of the corrected scores.

8. The data processing method according to claim 7, further comprising:

calculating a relation between a new data item and the existing data items on the basis of at least one of a generation source of data stored in the new data item, the type of the new data item, a statistical distribution of the data, and spectrum characteristics of the data, and calculating an initial coefficient of the new data item on the basis of the relation and the coefficient of the data item.

9. The data processing method according to claim 7, further comprising:

calculating an initial coefficient of a new user on the basis of the coefficients of a plurality of the users that have been registered; and calculating scores obtained by quantifying the amount of information displayed on the display screen for the new user, correcting the scores with the coefficients, and arranging the data items on the basis of the corrected scores.

10. A data processing device that processes time-series data including a plurality of data items, wherein the data processing device:

identifies a type of a data item in which the data is stored, using an overlap pattern indicating the type of the data item and a method for identifying the type, processes the data stored in the data item, using calculation designated for each type of the data item, and adds at least one or more new data items to the type of the data item storing the processed data, determines, from the at least one or more new data items, which of the at least one or more new data items do not contain an updated score, selects, from the at least one or more new data items that do not contain an updated score, a first data item that includes an input data item and an additional data item, acquires time period information including a monitoring start time and a monitoring end time, calculates, for the at least one or more new data items that do not contain an updated score, scores obtained by quantifying an amount of information displayed on a display screen for the at least one or more new data items that do not contain an updated score including the added data items, calculates, for the at least one or more new data items that do not contain the updated scores, the scores which are displayed on the displayed for a time period indicated by the time period information and a time period other than the time period, arranges the data items including the at least one or more new data items on the basis of a difference between the scores for the time period and the scores for a time period other than the time period, and acquires time information, detects change points of data stored in the data items including the added data items for a predetermined time period before and after the occurrence time, calculates the scores using the numbers of change points for the time period, and arranges the data items on the basis of the scores.

11. The data processing device according to claim 10, wherein the data processing device performs:

a process of creating statistical distributions of data stored in the data items including the added data items, calculating variances of the created statistical distributions as the scores, and arranging the data item on the basis of the calculated scores; or a process of performing spectrum analysis using Fourier transform for data stored in the data items including the added data items, calculating frequency ranges in which a spectrum is equal to or greater than a predetermined value as the scores, and arranging the data items on the basis of the calculated scores.

12. The data processing device according to claim 10, wherein the data processing device calculates a variance of a statistical distribution of the scores of the plurality of data items and provides the variance as an index for significance of arrangement.

13. The data processing device according to claim 10, wherein the data processing device acquires an average value of the scores of the plurality of data items and time period information including a start time and an end time, calculates the average value for a time period indicated by the time period information or a difference between the average values for time periods other than the time period, and provides the calculated value as an index for significance of data.

14. A non transitory computer-readable recording medium storing a program that causes a computer to perform:

identifying a type of a data item in which time-series data including a plurality of data items is stored, using an overlap pattern indicating the type of the data item and a method for identifying the type;

processing the data stored in the data item, using calculation designated for each type of the data item, and adding at least one or more new data items to the type of the data item storing the processed data;

determining, from the at least one or more new data items, which of the at least one or more new data items do not contain an updated score;

selecting, from the at least one or more new data items that do not contain an updated score, a first data item that includes an input data item and an additional data item;

acquiring time period information including a monitoring start time and a monitoring end time;

calculating, for the at least one or more new data items that do not contain the updated scores, scores obtained by quantifying an amount of information displayed on a display screen for the at least one or more new data items that do not contain the updated scores including the added data items;

calculating, for the at least one or more new data items that do not contain the updated scores, the scores which are displayed on the displayed for a time period indicated by the time period information and a time period other than the time period;

arranging the data items including the at least one or more new data items on the basis of a difference between the scores for the time period and the scores for a time period other than the time period; and acquiring time information, detecting change points of data stored in the data items including the added data items for a predetermined time period before and after the occurrence time, calculating the scores using the numbers of change points for the time period, and arranging the data items on the basis of the scores.

* * * * *